(12) United States Patent
Leone et al.

(10) Patent No.: US 8,763,367 B2
(45) Date of Patent: *Jul. 1, 2014

(54) ENGINE EXHAUST TEMPERATURE REGULATION

(75) Inventors: Thomas G. Leone, Ypsilanti, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/349,518

(22) Filed: Jan. 12, 2012

(65) Prior Publication Data

US 2012/0102925 A1    May 3, 2012

Related U.S. Application Data

(63) Continuation of application No. 12/120,879, filed on May 15, 2008, now Pat. No. 8,099,949.

(51) Int. Cl.
*F01N 3/00* (2006.01)

(52) U.S. Cl.
USPC .................................. 60/285; 60/274; 60/299

(58) Field of Classification Search
USPC ................ 60/274, 285, 299, 277; 123/1 A, 3
See application file for complete search history.

(56) References Cited

U.S. PATENT DOCUMENTS

| | | | |
|---|---|---|---|
| 6,116,083 A | 9/2000 | Cullen et al. | |
| 6,691,507 B1 | 2/2004 | Meyer et al. | |
| 7,043,349 B2 | 5/2006 | Cullen | |
| 7,159,568 B1 | 1/2007 | Lewis et al. | |
| 7,263,967 B2 * | 9/2007 | Hotta et al. | 123/275 |
| 7,610,896 B2 | 11/2009 | Kakuho et al. | |
| 7,661,414 B2 | 2/2010 | Kamio | |
| 2003/0209009 A1 | 11/2003 | Chamoto et al. | |
| 2003/0226398 A1 | 12/2003 | Hernandez et al. | |
| 2005/0028791 A1 * | 2/2005 | Niimi | 123/478 |
| 2006/0196472 A1 | 9/2006 | Niimi | |
| 2007/0215110 A1 | 9/2007 | Stein et al. | |

* cited by examiner

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

In one example, a method of operating an engine in a vehicle is described. The method comprises delivering a first substance to a cylinder of the engine from a first injector; delivering a second substance to the cylinder of the engine from a second injector, where the second substance has a greater heat of vaporization than the first substance; and increasing injection of the second substance responsive to an exhaust over-temperature condition.

16 Claims, 2 Drawing Sheets

ENGINE EXHAUST TEMPERATURE REGULATION

CROSS REFERENCE TO RELATED APPLICATIONS

The present application is a continuation of U.S. patent application Ser. No. 12/120,879 filed May 15, 2008, the entire contents of which are incorporated herein by reference for all purposes.

FIELD

The present description relates to a method for estimating and controlling exhaust gas temperature settings for an internal combustion engine operating with a variety of fuels of varying composition and fuel delivery.

BACKGROUND AND SUMMARY

Engines may use various forms of fuel delivery to provide a desired amount of fuel for combustion in each cylinder. One type of fuel injection, or delivery, uses a port injector for each cylinder to deliver fuel to respective cylinders. Another type of fuel injection uses a direct injector for each cylinder. Engines have also been described using more than one injector to provide fuel to a single cylinder in an attempt to improve engine performance.

One such example is described in US 2007/0215110 wherein a flexible multiple-fuel engine is described using both port and direct injection, where different fuel types are provided to the injectors. For example, direct injection of ethanol may be used with port injected gasoline. The direct injection of ethanol provides improved charge cooling (due to ethanol's higher heat of vaporization) and thus improved knock suppression. One embodiment controls fuel injection responsive to a variety of temperature-related engine operating conditions during engine start-up. For example, during start-up, fuel injection may be varied among the different injection locations to provide improved emission control and starting of combustion.

However, the inventors have herein recognized a potential issue with such an approach. For example, while different fuel adjustments can better accommodate warming and start-up conditions, there may also be over-temperature conditions at non-starting conditions. In other words, catalyst over-temperature is generally not an issue during starting. Rather, during towing and/or other high load conditions over varying terrain, catalyst over-temperature conditions may occur and degrade the catalyst materials.

In one example, the above issues may be addressed by a method of operating an engine in a vehicle, the method comprising: delivering a first substance to a cylinder of the engine from a first injector; delivering a second substance to the cylinder of the engine from a second injector, where the second substance has a greater heat of vaporization than the first substance; and increasing injection of the second substance responsive to an exhaust over-temperature condition.

In this way, it is possible to address exhaust over-temperature conditions by preferentially utilizing the increased heat of vaporization of the second fuel. Such an operation may be especially advantageous when the second substance is directly injected into the cylinder, since the fuel spray may not contact metal surfaces of the engine, so virtually all the heat of vaporization is provided by the air-fuel mixture, thus reducing exhaust gas temperature in addition to combustion temperature. Additionally, such an operation may be particularly useful when exhaust equivalence ratio is maintained near the stoichiometric ratio, since emission impacts of catalyst temperature protection may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
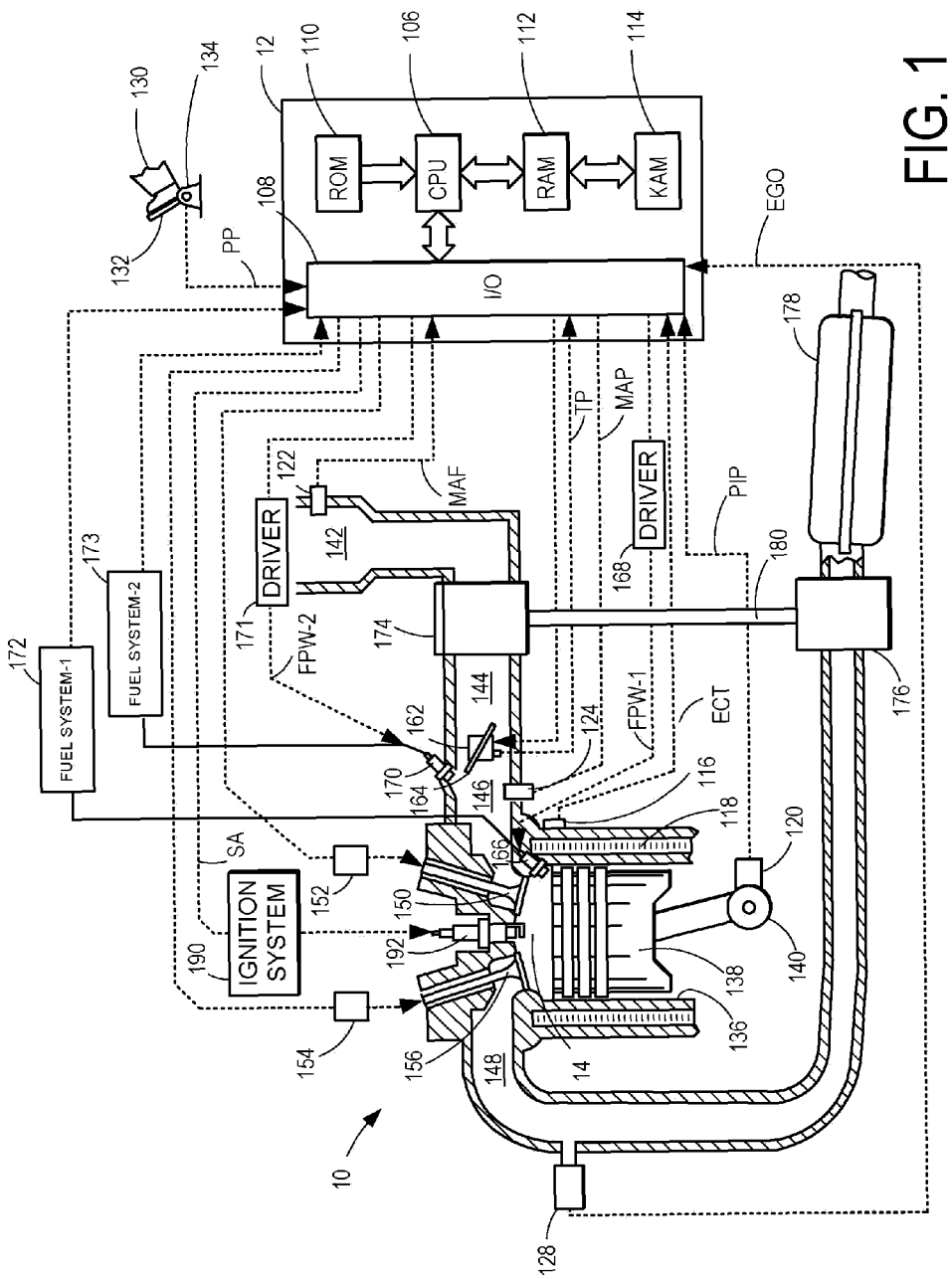
FIG. 1 shows an example embodiment of a combustion chamber operating with a plurality of fuel injector options.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

The temperature of the exhaust system may be maintained at or below a predetermined temperature, or within a predetermined temperature range, by exhaust temperature control routine 200, as further explained in FIG. 2. The predetermined temperature may, for example, be an upper limit temperature beyond which the reliability of the exhaust system components may be compromised. Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The relative distribution of the total injected fuel among injectors 166 and 170 may be referred to as an injection type. For example, injecting all of the fuel for a combustion event via injector 166 may be an example of a first injection type; injecting all of the fuel for a combustion event via injector 170 may be an example of a second injection type; injecting two-thirds of the fuel for a combustion event via injector 166 and the other third of the fuel via injector 170 may be an example of a third injection type; injecting a third of the fuel for a combustion event via injector 166 and the other two-thirds of the fuel via injector 170 may be an example of a fourth injection type. Note that these are merely examples of different injection types, and various other types of injection and delivery may be used, and further the approach may be applied to more than two injectors as well. Additionally, it should be appreciated that port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems 172 and 173 may hold fuel with different fuel qualities, such as different fuel compositions. These differences may include different alcohol content, different octane, different heats of vaporization, different fuel blends, and/or combinations thereof etc. One example of fuels with different heats of vaporization could include gasoline as a first substance with a lower heat of vaporization and ethanol as a second substance with a greater heat of vaporization. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other feasible substances include water, a mixture of alcohol and water, a mixture of alcohols etc. In still another example, both fuels may be alcohol blends with varying alcohol composition wherein the first fuel may be a gasoline alcohol blend with a lower concentration of alcohol than a gasoline alcohol blend of a second fuel with a greater concentration of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, etc.

Moreover, fuel characteristics of one or both fuel tanks may vary frequently. In one example, a driver may refill fuel tank 172 with E85 one day, and E10 the next, and E50 the next, while fuel tank 174 may have gasoline one day, and E10 the next, and gasoline the next. The day to day variations in tank refilling can thus result in frequently varying fuel compositions of each of the fuels in tanks 172 and 174, thereby affecting the fuel compositions and/or fuel qualities delivered by injectors 166 and 170, respectively. The differences in fuel composition and/or quality between injectors 166 and 170 may hereon be referred to as fuel type. Also, the fuel types may be separately delivered to the combustion chamber, or mixed before delivery to the combustion chamber.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Engine 10 may further include a fuel vapor purging system (not shown) for storing and purging fuel vapors to the intake manifold of the engine via vacuum generated in the intake manifold.

Figure 2:
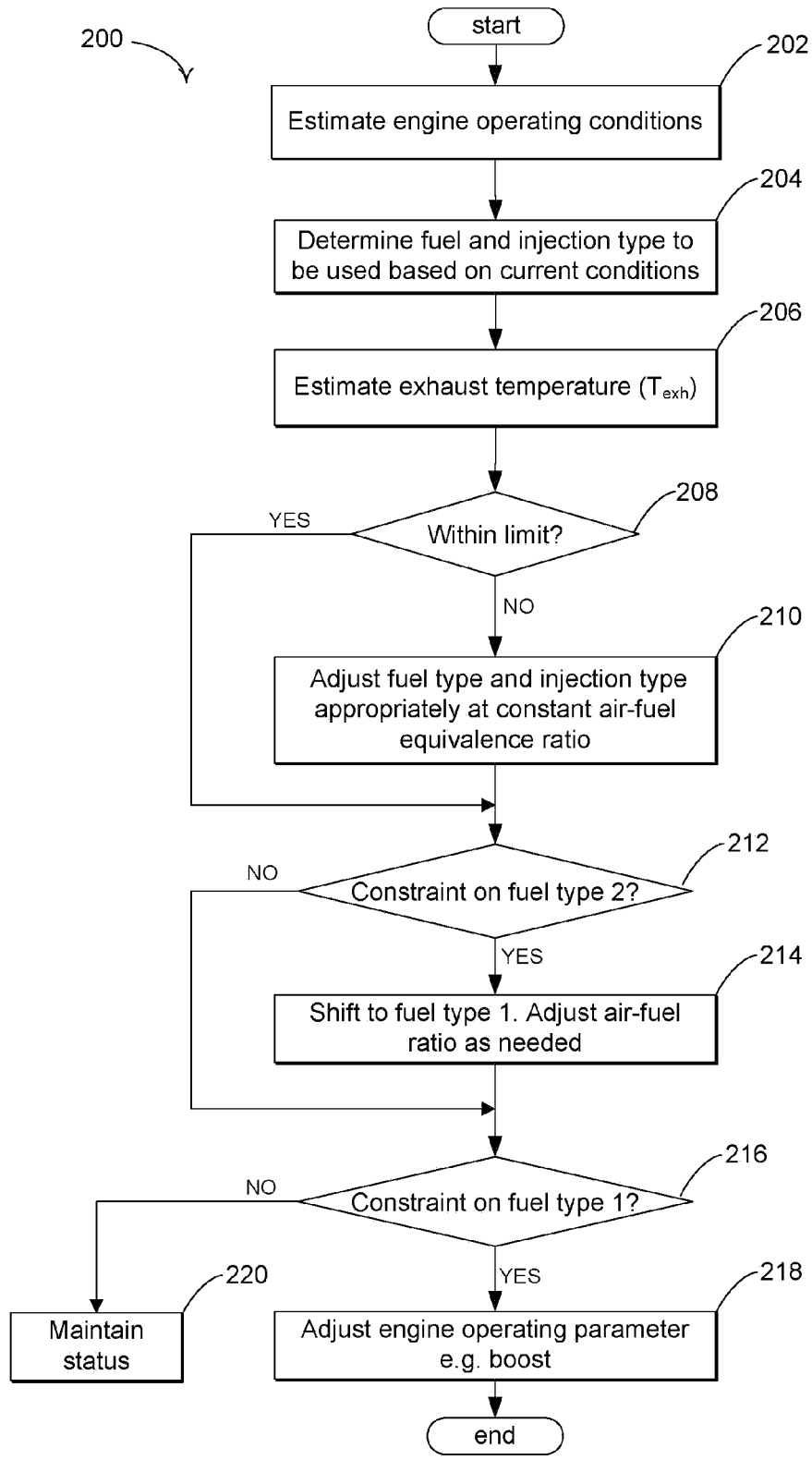
FIG. 2 shows a high level flow chart for engine running operations according to the present disclosure.

FIG. 2 describes a control system routine for controlling exhaust temperature for an internal combustion engine affecting engine operating parameters, a fuel type delivered, as well as the type of injection used, and combinations thereof. Specifically, the routine estimates an exhaust temperature, and suitably adjusts engine operation settings such as spark timing, air flow, air-fuel ratio or equivalence ratio, boost level, for example, and further selects a combination of fuel and injection type to be used so as to allow maintenance of exhaust temperature values within a prescribed operating range.

At 202 the engine operating conditions are identified. These include, but are not limited to, engine temperature, engine coolant temperature, engine speed, manifold pressure, air-fuel ratio, equivalence ratio, cylinder air amount, feedback from a knock sensor, desired engine output torque, spark timing, barometric pressure, etc.

Based on the identified operating conditions, at 204, a fuel type and injection type are selected. In one embodiment, two different fuels may be used for the two injectors wherein one may be port injected gasoline and the other may be direct injected E85. In one aspect of this embodiment, if the estimated operating conditions indicate an air-fuel ratio below a desired value, the control system may increase port injection of gasoline to allow the desired air-fuel ratio to be maintained. The bandwidth of adjustments, pulse width limits, and various other factors can influence which fuel(s) is adjusted and the relative amount of the adjustment. In another aspect, if the operating conditions indicate that the engine is operating close to knock limits, the control system may increase direct injection of E85 at medium to high operating loads to take advantage of the charge cooling effect of alcohol, while deferring usage of a port injected gasoline to low operating loads where knock may less constraining. In another aspect, if the operating conditions indicate that the engine is operating close to knock limits, the control system may maintain some port injection of gasoline and a reduced injection of E85, while also retarding spark timing from peak torque timing.

At 206, the exhaust temperature ($T_{exh}$) may be measured or estimated. The estimated temperature may reflect, for example, a catalyst temperature. Exhaust temperature may be estimated as a function of engine operating parameters such as engine rotational speed, engine load, amount of spark retard, air-fuel ratio, and the like, and may additionally be based on the current fuel type, injection type, and/or other fuel delivery characteristics.

In one embodiment, engine 10 may be a "flex-fuel" engine wherein a single fuel delivery method, specifically port fuel injection, may be employed for the delivery of a fuel blend that may vary depending on the blend of fuel added to fill the fuel tank. In such a scenario, the heat of vaporization of either fuel may be chiefly provided by the metal surfaces of the intake valves and ports of the port fuel injector, thereby making the effect of a fuel type on the exhaust temperature negligible. Therefore here, exhaust temperature may be primarily estimated as a function of the engine operating parameters.

In another embodiment, engine 10 may use both a direct injector and a port fuel injector in each cylinder for the delivery of a single type of fuel, such as gasoline. In such a scenario, the effect of injection type on exhaust temperature estimation may be negligible given that the heat of vaporization of gasoline is relatively low. In one analysis of such an engine, a back-to-back comparison of port injected gasoline versus direct injected gasoline reveals an air-fuel ratio difference of 0.1 for an equivalent exhaust temperature. Therefore, in such an engine arrangement, exhaust temperature may again be estimated as a function of the previously described engine operating parameters.

In still another embodiment, engine 10 may operate with both a multitude of fuel and delivery types. For example, a direct injection of an alcohol fuel blend, and a port injection of gasoline, where again the fuel blend can vary depending on the blend of fuel added to the tank. In such a situation, the high heat of vaporization of the directly injected alcohol based fuel, in conjunction with the fuel spray characteristics, may result in large exhaust temperature effects. Specifically, the directly injected fuel spray may not substantially contact metal surfaces thereby allowing the heat of vaporization to be provided by the air fuel mixture. Analyses indicate a significant potential difference in the enrichment affects on exhaust temperature upon comparison of exhaust temperatures for directly injected gasoline versus directly injected E85.

Given the dependence of exhaust temperature on fuel type, and further on fuel injection type, the exhaust temperature may be estimated by one of a multitude of mapping methods, based on the prevalent combination of fuel and fuel delivery type. In one example, a simple on/off mapping method may be used. This may be selected when the engine operates in two distinct modes, for example a DI of E85 or a PFI of gasoline. In such a situation, the control system may estimate the exhaust temperature independently in each mode as a function of engine operating parameters such as engine speed, engine load, air-fuel ratio, equivalence ratio, and the like.

In another example, exhaust temperature may be estimated by another mapping method. This may be selected when the engine operates with varying configurations of fuel type and injection type, such as DI of E85 and PFI of gasoline wherein the amount of fuel injected at any given cycle may be an appropriate distribution of fuel between both injectors. Under certain operating conditions, engine 10 may be injected with fuel that has a 10% component of ethanol from the direct injector and a 90% component of gasoline from the port fuel injector. In another set of operating conditions, engine 10 may be injected with fuel that has a 20% component of ethanol from the direct injector and an 80% component of gasoline from the port fuel injector, and so on. It may be appreciated that the injection ratios may further be dynamically altered as changes arise in engine operating conditions, fuel levels, etc. Under such dynamically changing conditions, the engine may be mapped for a wide range of possible combinations. A look-up table configured to estimate an exhaust temperature for a given combination of fuel type and injection type may thus be used. Alternatively, a curve-fit mapping method may be employed for the above described dynamically changing conditions wherein a certain degree of mapping data in conjunction with a certain degree of simulation data may provide an equation to relate exhaust temperature to a fuel type, injection type, and various combinations thereof.

At 208, the estimated $T_{exh}$ is compared to a predetermined limit. The predetermined temperature limit may be, for example, an upper limit temperature beyond which the exhaust system components may degrade. Alternatively, the limit may be set outside a predetermined temperature range within which the catalyst function may be maintained. Specifically, prolonged periods of catalyst over-temperature conditions may degrade the catalyst materials. While catalyst over-temperature conditions arising during engine start-up and warming conditions may be addressed by adjusting parameters such as spark timing, enrichment, boost, etc. to decrease exhaust temperature, over-temperature conditions at non-starting conditions may be addressed differently. Thus, over-temperature conditions that occur at non-starting conditions, such as during towing and/or other high load conditions over varying terrain, may utilize a multitude of adjustments. These may include adjustments to combinations of fuel type, injection type, boost level and spark timing, for example.

For example, if exhaust over-temperature conditions are detected at 208, at 210, the control system may proceed to appropriately perform a variety of adjustments, as elaborated herein below. The fuel combustion characteristics, heats of vaporization, fuel availabilities, charge cooling abilities of the prevalent fuels, and the prevalent engine operating conditions may be weighed in when selecting the appropriate fuel type, fuel injection type, and distribution ratio of fuel among the multiple injectors In one example, engine 10 may use a PFI injector to inject gasoline (hereafter also referred to as "fuel type 1") and a DI fuel injector to inject E85 or an ethanol blend (hereafter also referred to as "fuel type 2"). When the system senses exhaust temperature over-shoot, the control system may respond by increasing injection of the second fuel type, while at the same time decreasing injection of the first fuel type (gasoline), while maintaining a desired air-fuel equivalence ratio of the exhaust, to reduce exhaust over-temperature. Such operation may be taken under selected conditions, such as when sufficient storage of the second fuel type is available, and when the alcohol concentration of the second fuel type is above a threshold, such as E50 (50% ethanol and 50% gasoline). By taking advantage of the charge cooling properties of the alcohol based fuel while not disturbing the air-fuel equivalence ratio, the exhaust over-temperature may be addressed without compromising engine performance.

Charge cooling from the alcohol based fuel may have both a direct effect on exhaust temperature, and an indirect effect on exhaust temperature due to improved knock limits. For example, when operating primarily with a port injection of gasoline, knocking may be addressed by retarding the spark timing. However, while this approach allows knocking to be reduced, it increases exhaust temperature. Alternatively, when addressing knock by increasing direct injection of ethanol, for example, spark timing can be advanced back to a peak torque timing, thus reducing exhaust temperature by both reducing spark retard, and by changing the composition of the combusted fuel.

Thus in one example, the system may address knocking and exhaust temperature increases when operating with a spark retard, by advancing the spark timing in addition to increasing injection of the second fuel type and decreasing injection of the first fuel type. The amount of the spark timing advance may be based on the amount of increased injection of the second fuel. Furthermore, the amount of spark timing advance and the amount of increased injection of the second fuel may in turn be based on the storage level of the first or second fuels. In one aspect of this example, if the system detects the level of E85 in the corresponding fuel tank 172 falling below a threshold level, the system may adjust knock levels and exhaust over-temperature conditions by increasing direct injection of E85 by a smaller amount and retarding spark timing by a larger amount. In another aspect of this example, if the system detects the level of gasoline in the corresponding fuel tank 173 falling below a threshold level, the system may adjust knock levels and exhaust over-temperature conditions by increasing direct injection of E85 by a larger amount and advancing spark timing by a corresponding amount, thus using less, or no, spark retard. In this way, the system may coordinate use of spark retard and gasoline/E85 usage to address knock and exhaust over-temperature, while balancing consumption of the various fuels.

In another example, in addition to increasing injection of the second fuel and reducing injection of the first fuel, the exhaust mixture may be enriched to allow exhaust temperature control to ensue (the enrichment may be achieved by increasing the first fuel type, the second fuel type, or both). In yet another example, in further addition to increasing injection of the second fuel, and reducing injection of the first fuel, boost levels may be reduced after enriching the exhaust mixture. In still another example, the injection of both first and second fuels may be increased followed by exhaust mixture enrichment to contain exhaust temperature rises.

Next, the control system allows the exhaust temperature to be further regulated responsive to current and potential fuel constraints. At 212, the system checks for constraints on fuel type 2 wherein further addition of fuel type 2 may not be possible, or not desirable. In the example cited above, an increasing injection of fuel type 2 responsive to an estimated exhaust over-temperature proceeds until reaching a constraint on the second fuel. This may arise when directly injected fuel type 2 reaches a 100% ethanol limit whereafter further adjustments to exhaust temperature may not be achieved by increasing the amount of DI. Alternative constraints on fuel type 2 may include, for example, the direct injector running at a maximum duty cycle, depleting storage of fuel type 2 in fuel tank 172, drop in separation performance of a fuel separator located in fuel tank 172 or a combination thereof. Further still, a constraint may be imposed when it is desirable to curtail consumption of the alcohol based fuel and defer usage to an alternate time, for example during higher engine loads where knock constraints are more prevalent.

If at 212, constraints on fuel type 2 are identified, then at 214, the control system may shift to adjusting fuel type 1 in response to the catalyst over-temperature. In the embodiment described above, if for example the direct injector has reached the 100% ethanol limit, then the engine may operate on an increased port injection of gasoline. However, this adjustment may alter the air-fuel equivalence ratio. In addition to increasing the injection of fuel type 1, the controller may enhance enrichment, reduce boost levels, retard spark timing, or any combination thereof. If no constraint on fuel type 2 is identified at 212, the routine progresses directly to 216.

An increasing injection of fuel type 1 responsive to an estimated exhaust over-temperature then proceeds until a constraint on fuel type 1 is identified at 216. In the described embodiment, constraints on fuel type 1 may arise, for example if the port injector is running at a maximum duty cycle, if the engine approaches a predetermined smoke limit, or if the AFR reaches a lowest permissible boundary (i.e., becomes too rich). If no constraint is identified, at 220 the routine proceeds to maintain the engine's status. However, in the event where consecutive checks have identified constraints on both fuel types 1 and 2, the control system may regulate the exhaust temperature by adjusting alternate engine operating parameters, for example by reducing boost levels, at 218. Alternative adjustments may involve valve operations such as valve timing, valve lift, and duration of valve opening or closing, shifting of transmission, etc.

By adjusting engine operations, such as spark timing, boost level, wastegate position, bypass valve position etc, based on exhaust temperature and a desired operational temperature range, and further taking into account fuel composition, and the delivery of a first and second fuel, it may be possible to monitor and control exhaust temperature variations while allowing for interactions between fuel type and injection type. For example, as an exhaust temperature limit is reached, fuel injection may be adjusted responsive to variation in the amount of ethanol in a fuel blend that is directly injected into the engine, as well as responsive to the relative distribution of the total amount of injected fuel from among a plurality of injectors for the cylinder, while maintaining a desired air-fuel or equivalence ratio. Such compensations may allow the exhaust temperature to be maintained within limits at high power levels with reduced enrichment, thereby improving fuel consumption, exhaust emissions, and component temperature protection at high power levels, even when the fuel type and injection type changes dynamically during engine operation.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An engine method, comprising
    injecting first and second fuels to an engine cylinder from first and second injectors, respectively, the second fuel having a greater alcohol amount than the first fuel;
    during select conditions, adjusting spark timing, enrichment, and boost level responsive to catalyst over-temperature conditions that degrade catalyst materials; and
    during towing conditions, increasing the second fuel injection responsive to the catalyst over-temperature conditions.

2. The method of claim 1 where the first fuel includes gasoline and the second fuel includes E85.

3. The method of claim 1 further comprising varying delivery of the first and second fuels during engine operation, and where alcohol composition of at least one of the first and second fuels varies.

4. The method of claim 1 further comprising reducing injection of the first fuel while increasing injection of the second fuel to maintain a desired air-fuel equivalence ratio of an exhaust from the cylinder, while reducing exhaust over-temperature.

5. The method of claim 4 wherein first the second fuel is increased and the first fuel is reduced responsive to the over-temperature condition, and then the exhaust air-fuel equivalence ratio is enriched to control exhaust temperature below a threshold value.

6. The method of claim 5 further comprising reducing a boost level after enriching the exhaust air-fuel equivalence ratio to control exhaust temperature below the threshold value.

7. The method of claim 4 where said reducing injection of the first fuel while increasing injection of the second fuel proceeds until reaching a constraint on the second fuel, and then the exhaust air-fuel equivalence ratio is enriched to control exhaust temperature below a threshold value.

8. The method of claim 4 where said reducing injection of the first fuel while increasing injection of the second fuel proceeds until depleting storage of the second fuel, and then the exhaust air-fuel equivalence ratio is enriched to control exhaust temperature below a threshold value.

9. The method of claim 8 where said enrichment of the exhaust air-fuel equivalence ratio proceeds until reaching a constraint on the first fuel, and then a boost level is reduced to control exhaust temperature below the threshold value.

10. The method of claim 8 where said enrichment of the exhaust air-fuel equivalence ratio proceeds until depleting storage of the first fuel, and then a boost level is reduced to control exhaust temperature below the threshold value.

11. A method of operating an engine in a vehicle, the method comprising
   delivering a first fuel to a cylinder of the engine from a first port injector;
   delivering a second fuel to the cylinder of the engine from a second, direct, injector, where the second fuel has a greater concentration of alcohol than the first fuel;
   during a first mode, increasing injection of the second fuel while decreasing injection of the first fuel responsive to an exhaust over-temperature condition, the first mode including non-starting towing operation;
   during a second mode, enriching an exhaust mixture from the cylinder responsive to the exhaust over-temperature condition, the over-temperature condition including catalyst over-temperature conditions that degrade catalyst materials; and
   during a third mode, reducing boosting of the engine responsive to the exhaust over-temperature condition.

12. The method of claim 11 further comprising selecting among the first and second modes based on a storage level of the first and second fuels.

13. The method of claim 11, where the first mode is selected when an amount of the second fuel stored is greater than a threshold level, and where the second fuel has an alcohol concentration greater than a threshold value.

14. The method of claim 11 further comprising selecting among the first and second modes responsive to constraints on said first and second fuels, and where a third mode including reducing boost in response to the exhaust over-temperature condition when both the first and second fuels are constrained, where the first mode is selected when availability of the second fuel is above a first threshold and the second mode is selected when availability of the second fuel is below the first threshold.

15. An engine method, comprising
   delivering a first fuel to an engine cylinder;
   delivering a second fuel to the cylinder, where the second fuel has a greater concentration of alcohol than the first fuel;
   operating with spark retarded from a peak torque timing; and
   increasing the second fuel injection while decreasing the first fuel injection responsive to exhaust over-temperature conditions and advancing spark timing, a spark advance amount based on an amount of the second fuel injection increase.

16. The method of claim 15 wherein the second fuel injection increase amount is based on a storage level of the first or second fuel.

* * * * *